US012199735B2

(12) United States Patent
Zeng et al.

(10) Patent No.: US 12,199,735 B2
(45) Date of Patent: Jan. 14, 2025

(54) PERFORMANCE-BASED LINK MANAGEMENT COMMUNICATIONS

(71) Applicant: The MITRE Corporation, McLean, VA (US)

(72) Inventors: Dongsong Zeng, Germantown, MD (US); John C. Gonda, III, Falls Church, VA (US)

(73) Assignee: THE MITRE CORPORATION, McLean, VA (US)

( * ) Notice: Subject to any disclaimer, the term of this patent is extended or adjusted under 35 U.S.C. 154(b) by 0 days.

(21) Appl. No.: 18/197,547

(22) Filed: May 15, 2023

(65) Prior Publication Data

US 2023/0336240 A1 Oct. 19, 2023

Related U.S. Application Data

(63) Continuation of application No. 17/222,450, filed on Apr. 5, 2021, now Pat. No. 11,689,277, which is a continuation of application No. 16/365,104, filed on Mar. 26, 2019, now Pat. No. 10,972,175, which is a
(Continued)

(51) Int. Cl.
*H04B 7/185* (2006.01)
*H04L 45/24* (2022.01)
*H04L 47/26* (2022.01)

(52) U.S. Cl.
CPC ....... *H04B 7/18506* (2013.01); *H04L 45/245* (2013.01); *H04L 47/26* (2013.01)

(58) Field of Classification Search
CPC .... H04B 7/18506; H04L 45/245; H04L 47/26
See application file for complete search history.

(56) References Cited

U.S. PATENT DOCUMENTS

| 4,359,733 | A | 11/1982 | O'Neill |
| 6,138,274 | A | 10/2000 | Huang et al. |
| 6,990,319 | B2 | 1/2006 | Wright et al. |

(Continued)

OTHER PUBLICATIONS

Grappel. R.D., "Internet over the VDL-2 Subnetwork—the VDL-2/IP Aviation Datalink System," Report No. NASA/G-2, Lincoln Laboratory, Massachusetts Institute of Technology, Oct. 20, 2000.
(Continued)

*Primary Examiner* — Mansour Oveissi
(74) *Attorney, Agent, or Firm* — Sterne, Kessler, Goldstein & Fox P.L.L.C.

(57) ABSTRACT

Disclosed herein are system, method, and computer program product embodiments for utilizing parallel links to improve sub-network availability and latency performance for ATC traffic. An embodiment operates by receiving a generated message. The type of the generated message is determined, where the type is an air traffic control message or a non-air traffic control message. Based on the type of message, communication links are selected, where the communication links include parallel transmission links or a serial link. The method continues by copying the generated message and transmitting the copied message using the selected communication links. The method waits to receive an acknowledgement indicating receipt of the transmitted message. Upon identifying an acknowledgement, any of the copied messages not yet retransmitted are deleted.

20 Claims, 9 Drawing Sheets

Related U.S. Application Data continuation of application No. 14/827,733, filed on Aug. 17, 2015, now Pat. No. 10,243,646.

(56) References Cited

U.S. PATENT DOCUMENTS

| | | | |
|---|---|---|---|
| 7,477,597 B2 | 1/2009 | Segel | |
| 8,145,208 B2 | 3/2012 | Chari et al. | |
| 8,280,563 B2 | 10/2012 | McGuffin et al. | |
| 8,284,674 B2 | 10/2012 | True et al. | |
| 8,750,266 B2 | 6/2014 | de Lind Van Wijngaarden | |
| 9,038,160 B2 | 5/2015 | Kauffman et al. | |
| 10,243,646 B2 | 3/2019 | Zeng et al. | |
| 10,972,175 B2 | 4/2021 | Zeng et al. | |
| 2002/0003790 A1* | 1/2002 | Heppe | H04B 7/18506 370/349 |
| 2003/0139135 A1 | 7/2003 | Rossi | |
| 2003/0225492 A1 | 12/2003 | Cope et al. | |
| 2009/0144385 A1 | 6/2009 | Gold | |
| 2010/0182952 A1 | 7/2010 | Jeong et al. | |
| 2010/0262715 A1* | 10/2010 | Tamalet | H04L 67/51 709/238 |
| 2011/0249970 A1 | 10/2011 | Eddleston et al. | |
| 2013/0089039 A1 | 4/2013 | Vashi et al. | |
| 2014/0254598 A1 | 9/2014 | Jha et al. | |
| 2016/0219024 A1 | 7/2016 | Verzun et al. | |
| 2016/0328356 A1 | 11/2016 | Lesartre et al. | |
| 2017/0054490 A1 | 2/2017 | Zeng et al. | |
| 2019/0245610 A1 | 8/2019 | Zeng et al. | |
| 2021/0250085 A1 | 8/2021 | Zeng et al. | |

OTHER PUBLICATIONS

Vojcic, B. et al., "Network of Mobile Networks; Hybrid Terrestrial-Satellite Radio," 2009 International Workshop on Satellite and Space Communications, Siena, Italy, 2009, pp. 451-455, doi: 10.1109/IWSSC.2009.5286308.

* cited by examiner

800

PERFORMANCE-BASED LINK MANAGEMENT COMMUNICATIONS

RELATED APPLICATION

This application is a continuation of U.S. application Ser. No. 17/222,450, filed Apr. 5, 2021, which is a continuation of U.S. application Ser. No. 16/365,104, filed Mar. 26, 2019 (now U.S. Pat. No. 10,972,175), which is a continuation of U.S. application Ser. No. 14/827,733, filed on Aug. 17, 2015 (now U.S. Pat. No. 10,243,646), all entitled "Performance-Based Link Management Communications," which are incorporated by reference herein in their entirety.

STATEMENT UNDER MPEP 310

The U.S. government has a paid-up license in this invention and the right in limited circumstances to require the patent owner to license others on reasonable terms as provided for by the terms of Contract No. 0215BB05AA, awarded by the FAA Data Communications Program.

FIELD OF THE INVENTION

Embodiments included herein generally relate to utilizing parallel links in air traffic control communications. More particularly, embodiments relate to utilizing parallel links in a performance-based link management system to improve the sub-network availability and latency performance for air traffic control communication systems.

BACKGROUND

Air Traffic Control (ATC) depends upon secure and reliable communications between ground-based controllers and aircraft in controlled and non-controlled airspace. In order to meet the needs of secure and reliable communication, the Aircraft Communications Addressing and Reporting System (ACARS) protocol and the Aeronautical Telecommunications Network Open Systems Interconnection (ATN OSI) protocol were designed in the ATC data communication protocol stacks, to name a few. The ACARS protocol utilizes various sub-networks, such as Very High Frequency Data Link-Mode 2 (VDL-Mode 2), Plain Old ACARS (POA or VDL Mode 0/A), ACARS over AVLC, Inmarsat (SATCOM), Iridium (SATCOM), and High Frequency Data Link (HFDL), that may be used to transmit the messages. Currently, the United States uses the ACARS based protocol, first deployed in 1978. Although there are many types of ACARS protocols available, the United States specifically uses the Future Air Navigation System (FANS) protocol. The FANS protocol provides a direct data communication link between the pilot in the aircraft and the air traffic controller at the ground-based controller.

In Europe, ATC data communication uses Link2000+, a type of ATN OSI protocol also known as ATN B1 implementation using solely the VDL Mode 2 sub-network. The International Civil Aviation Organization (ICAO) introduced the ATN OSI protocol around the year 2000, following the certification of FANS in 1995. There was a general belief that the newer ATN OSI was superior to the older FANS in terms of performance due to the advancements in technology. In response, the Federal Aviation Administration declared the FANS protocol would transition to the ATN OSI protocol in the United States. The FAA decided to implement this transition and wrote in the FAA Data Communications Program (DCP) documents comprising the Segment 1 (S1) Investment Analysis Readiness Decision (IARD), the S1 Initial Investment Decision (IID) and the S1 Final Investment Decision (FID) information pertaining to this transition. However, the assumption that ATN OSI would be superior to FANS has proved to be premature.

Today, ATN OSI over VDL Mode 2 is experiencing technical issues in Europe including provider aborts and long delays.

Provider aborts occur in a communication system when there may be a sustained loss of end-to-end connectivity, thus loss of availability. Even though these provider abort and long delay issues were observed some time ago, they did not receive substantial attention until relatively recently.

European Technical groups were formed to investigate the technical issues with the ATN OSI European data link. In 2014, the European Aviation Safety Agency (EASA) released an investigation report on technical issues in the implementation of a European Rule of the ATN OSI over VDL Mode 2. EASA found the technical issues to be sufficiently critical that the European Commission decided to postpone the ATN OSI data link rule for 5 years, from 2015 to 2020. Given the complicated nature of the ATN OSI over VDL Mode 2 technical issues, whether they can be completely fixed or not is an open issue.

In addition to ATN OSI technical issues, the FANS customized protocol also suffers from delays associated with latency performance. In the ATN OSI network, provider aborts take place after a delay of longer than 6 minutes. In the FANS network, there is no provider abort mechanism, so FANS does not have a provider abort issue, however the FANS protocol employs a means to try other sub-networks, in series. FANS, therefore allows longer delays, which suits strategic planning but which makes it impractical for tactical operation. The performance issues in FANS and ATN OSI prevent them from replacing voice to become a primary ATC communication for time critical exchanges. Accordingly, there is a need for improvement in air traffic control communications availability and latency performance.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

SUMMARY

Figure 1:
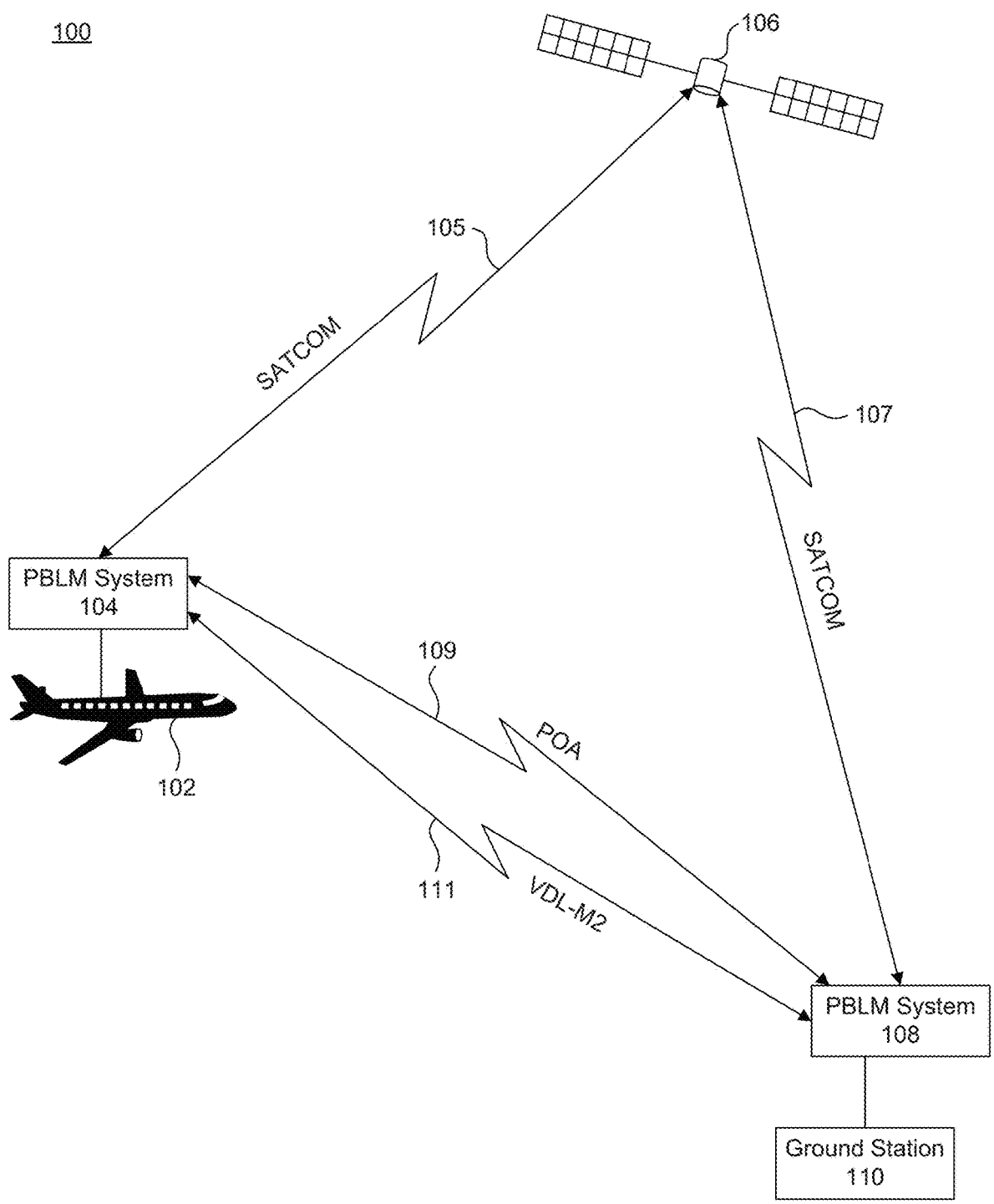
FIG. 1 is a block diagram of an air traffic control communication system providing a plurality of parallel data links between the aircraft and the ground station, according to an example embodiment.

Provided herein are embodiments for performance-based link management systems that solve issues of existing systems (such as sub-network availability and latency performance) by utilizing parallel links.

An embodiment includes a method for utilizing parallel links in a performance-based link management system. The method includes receiving a generated message, determining a type of the received message, whether the type is an air traffic control message or a non-air traffic control message. Based on the type of message, the method selects communication links comprising a plurality of parallel transmission links or a serial link. The method copies the generated message and transmits the copied message using the selected communication links, and waits to receive an acknowledgement indicating receipt of the transmitted message. Upon identifying the acknowledgement, the method deletes any of the copied messages not yet retransmitted.

Another embodiment includes a system having a router processor that is operable to receive a generated message. The router processor determines the type of the generated message, whether the type is an air traffic control message or a non-air traffic control message. Based on the type of message, the router processor selects communication links comprising a plurality of parallel transmission links or serial links. The router processor then copies the generated message and transmits the copied message using the selected communication links via a transmitter. The router processor waits to receive an acknowledgement of the transmitted message and upon identifying the acknowledgement from a receiver, any of the copied messages not yet retransmitted are deleted.

A further embodiment includes a tangible computer-readable medium having stored therein instructions for execution by one or more processors to perform a method for utilizing parallel links in a performance-based link management system. The method includes receiving a generated message, determining a type of the received message, whether the type is an air traffic control message or a non-air traffic control message. Based on the type of message, the method selects communication links comprising a plurality of parallel transmission links or a serial link. The method copies the generated message and transmits the copied message using the selected communication links, and waits to receive an acknowledgement indicating receipt of the transmitted message. Upon identifying the acknowledgement, the method deletes any of the copied messages not yet retransmitted.

Further features and advantages of the embodiments disclosed herein, as well as the structure and operation of various embodiments, are described in detailed below with reference to the accompanying drawings. It is noted that the invention is not limited to the specific embodiments described herein. Such embodiments are presented herein for illustrative purposes only. Additional embodiments will be apparent to a person skilled in the relevant art based on the teachings contained herein.

DETAILED DESCRIPTION

Embodiments of performance-based link management (PBLM) address existing issues with ATC communication customizable protocols. As ATC communication currently exists, existing ATC communication protocol stacks, including FANS, ATN OSI, Internet Protocol Suite (IPS), and Internet Protocol (IP) Tunneling, are not performance-based. In addition, these existing ATC communication protocol stacks use serial link transmission for both ATC and non-ATC traffic, i.e., transmitting a message using one link at a time, and moving to the next link when the previous link exhausts the link's retries. By using the performance-based link management system, the ATC messages are simultaneously transmitted using parallel links based on ATC performance requirements, e.g., Required Availability, and Required Communication Technical Performance (RCTP), using the pre-existing transceivers on the aircraft and at the ground-based controller with updates to their configuration.

Embodiments enable a performance-based link management system to utilize parallel links in order to more quickly and effectively transmit and receive ATC messages. There are advantages for using simultaneous parallel links in ATC communication. One advantage is significantly increasing the sub-network availability. Sub-network availability refers to the availability of the transceiver radios (i.e., whether the transceiver radios are not transmitting, receiving messages or in a deactivated state). Another advantage for using simultaneous parallel links is reducing the sub-network technical delay multi-fold. The sub-network technical delay refers to the network latency of the transmission data links. Another advantage for using simultaneous parallel links is robustness to sub-network Denial-of-Service (DoS) attacks. In a parallel communication network, single link Denial-of-Service attack may degrade the network latency performance, but the message may still transmit to the message's desired destination.

FIG. 1 illustrates an embodiment of an air traffic control communication system 100 for providing a plurality of parallel data links between an aircraft 102 and ground station 110. Air traffic control communication system 100 includes aircraft 102, the aircraft's PBLM system 104, satellite 106, the ground station's PBLM system 108, the ground station 110, and a plurality of parallel links between the aircraft's PBLM system 104 and the ground station's PBLM system 108. Each of the aircraft's PBLM system 104 and the ground station's PBLM system 108 may be implemented using one or more processors, according to an embodiment. Although the aircraft's PBLM system 104 and the ground station's PBLM system 108 are shown to be external to the aircraft 102 and ground station 110, respectively, the aircraft's PBLM system 104 is housed inside of aircraft 102 and ground station's PBLM system 108 is housed inside of ground station 110.

In an embodiment, in the air traffic control communication system 100, when the aircraft's PBLM system 104 transmits ATC or the non-ATC messages, the aircraft's PBLM system 104 enables the configuration for the parallel links based on the ATC performance requirements, e.g., Required Availability, and/or RCTP. In an embodiment, the ground station's PBLM system 108 also enables the configuration for the parallel links based on the ATC performance requirements when transmitting ATC or non-ATC messages. In an alternative embodiment, air traffic control communication system 100 may be configured in an oceanic environment. In alternative embodiments, the aircraft may be on the runway, may be flying to the aircraft's final destination at a particular altitude, or may be climbing upwards or descending. Further, another embodiment includes a mobile vehicle environment.

In an embodiment, the aircraft's PBLM system 104 may enable the use of a Satellite Communications (SATCOM) link 105 to transmit either the ATC or non-ATC messages to the satellite 106. The satellite 106 transmits the received ATC or non-ATC messages from link 105 to the ground station's PBLM system 108 over SATCOM link 107. In an embodiment, the aircraft's PBLM system 104 may enable the use of a POA link 109 to transmit the ATC or non-ATC messages to the ground station's PBLM system 108. In an embodiment, the aircraft's PBLM system 104 may enable the use of a VDL-M2 link 111 to transmit ATC or non-ATC messages to the ground station's PBLM system 108. In an embodiment, the ground station's PBLM system 108 may use the same SATCOM, POA, and VDL-M2 link to transmit ATC or non-ATC messages to the aircraft's PBLM system 104.

The aircraft's PBLM system 104 may not be limited to the ACARS sub-networks of SATCOM link 105, SATCOM link 107, POA link 109, and/or VDL-M2 link 111. In embodiments, the aircraft PBLM system 104 may use different sub-networks such as but not limited to Inmarsat, Iridium, and different variations of HFL. The ground station's PBLM system 108 may not be limited to the ACARS sub-networks of SATCOM link 105, SATCOM link 107, POA link 109, and/or VDL-M2 link 111. In an embodiment, the ground station PBLM system 108 may use different sub-networks such as but not limited to Inmarsat, Iridium, and HFDL. The aircraft's PBLM system 104 and the ground station's PBLM system 108 may have the same or different number of parallel links for a particular embodiment. To meet the requirement of S1 DCP for a required 0.9999 availability, the number of parallel links needed may be at least 3, in an embodiment. In alternative embodiments, more or less links may be used per particular applications based on external requirements or environmental configurations.

An advantage to using parallel links for transmission in the air traffic control communication system 100 includes increasing the sub-network availability. To understand how parallel links increase the sub-network availability, assume n simultaneous parallel links are used to transmit a message. Assume the availabilities of the n simultaneous parallel links are denoted by $A_1, A_2 \ldots A_n$. The overall availability A of the n simultaneous parallel links may be calculated by using the product operator as follows:

$$A = 1 - \prod_{i=1}^{n}(1 - A_i) \quad (1)$$

In Equation 1, assume the availability A of each link is the same, i.e., 0.99. In this case, the unavailability is 1–A, or 0.01. The availability of two parallel links (where n=2) is 0.9999. This reduces the unavailability 100 times or to $10^{-4}$. The availability for three parallel links is 0.999999, which reduces the unavailability 10000 times or to $10^{-6}$. This shows a direct relationship between the number of links and the availability. In order to meet the requirements of the DCP S1 report, the sub-network availability has to meet a required availability of 0.9999. If three parallel links or more are used, as shown using Equation 1, this requirement is met.

Another advantage of using simultaneous links may be the ability of the simultaneous links to defeat DoS attacks. DoS attacks are attempts to make a machine or network resource unavailable to the machine's intended users. The DoS attack will affect the ability for ATC communication to transmit information over single links. However, by using n parallel links even in the midst of DoS attacks, the messages can still reliably reach the message's destination.

Figure 2:
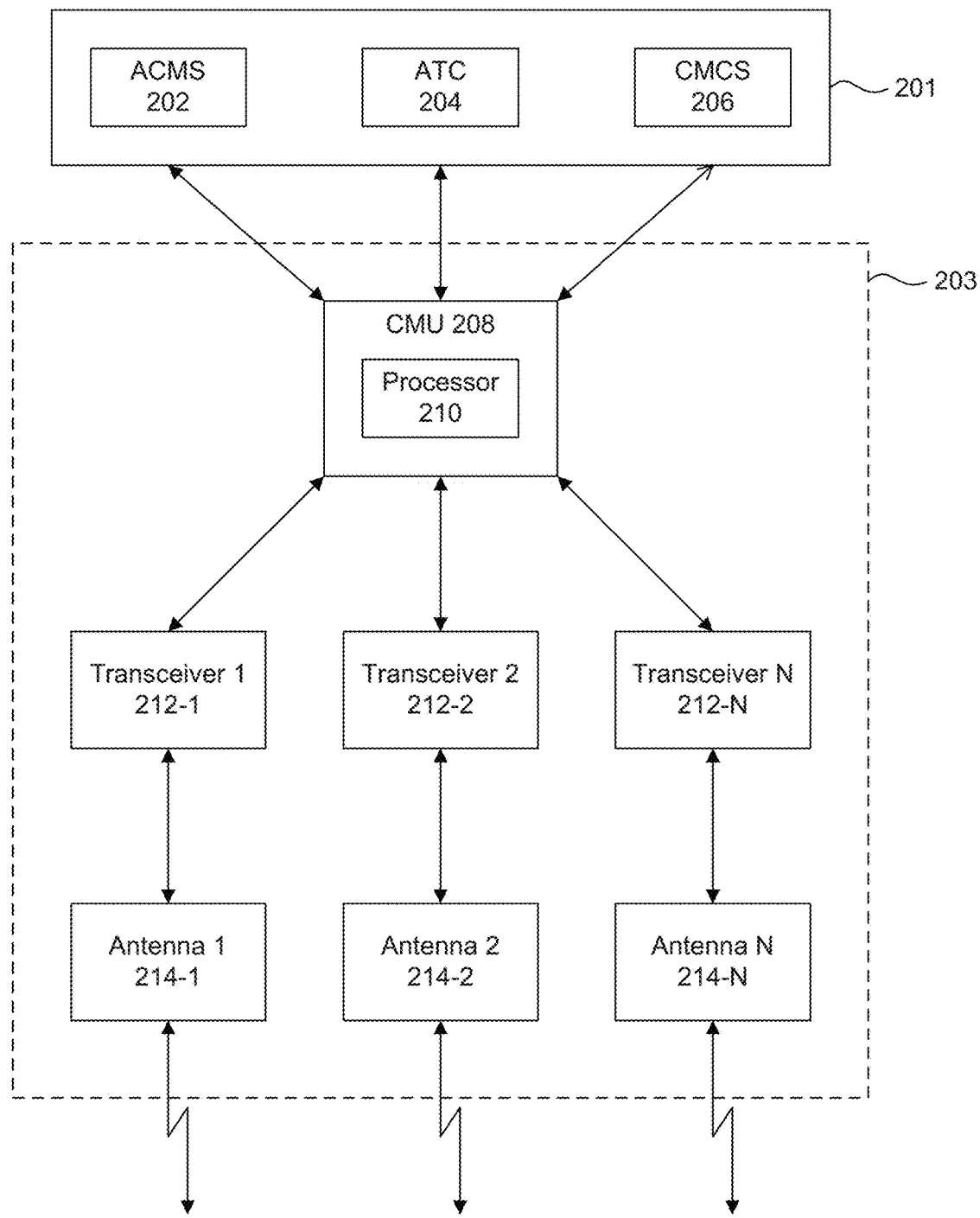
FIG. 2 is a block diagram of a performance-based link management system that includes multiple transceivers, a router and multiple external sensors, according to an example embodiment.

FIG. 2 illustrates components within the aircraft's PBLM system 104 in the aircraft 102, according to an example embodiment. In an embodiment, PBLM system 200 may incorporate features to transmit application messages and receive message data in parallel. These features include remote avionic applications 201 and a communication system 203. Generally, applications pass data to an antenna via a router. In an embodiment, the router appears as equipment known as a Communications Management Unit (CMU) 208 in the communications system 203. The CMU 208 utilizes a processor 210 which may be configured to parallelize the applications' messages to each of the suitable transmission mediums (SATCOM, POA, VDL-M2) through the transceivers 212 and antennas 214. The CMU 208 has the capability to transmit data to the ground station 110 and receive data from the ground station's PBLM system 108. The components of the PBLM system 200 illustrate the architecture of a conventional ACARS platform in the aircraft 102.

The CMU 208 gathers information relating to the airline from the remote avionic applications 201. The remote avionic applications 201 pass application specific information to the CMU 208 in which to transmit, according to an embodiment. The remote avionic applications 201 may include an Aircraft Conditioning Monitor System (ACMS) module 202 used for monitoring and controlling the status of the onboard systems and equipment, as well as variations in the flight conditions and to the operation of the flight equipment. The remote avionic applications 201 may also include an Air Traffic Control module (ATC) 204 which is capable of receiving and transmitting any pertinent information for air traffic control. Lastly, a Central Maintenance Computer System (CMCS) module 206 may be used for collecting and analyzing complete maintenance information. The CMCS module 206 collects, consolidates and reports issues to aid flight crew and maintenance personnel in maintenance procedures.

According to an example embodiment, the PBLM system 200 may also include transceivers 212-1 through 212-$n$, in which those transceivers 212 may use SATCOM, Very High Frequency (VHF), and High Frequency (HF) data links. These transceivers 212 and antennas 214 operate over different frequency ranges and may transmit and receive in parallel to increase reliability. Parallel transmission and reception may help with latency, provider abort delays, and increase the availability of each of the transceivers 212. The antennas 214 are attached to each of the transceivers 212, where the antennas 214 range from 1 to n, one antenna for each transceiver 212. Because the CMU 208 may be configured to pass the data messages from the remote avionic applications 201 to transceivers 212 in FIG. 2, the antennas 214 connected to each transceiver 212 may be both passive and active antennas 214, in which they both receive and transmit the data, respectively, according to an embodiment. In an embodiment, one transceiver 212-1 may be connected to one antenna 214-1 to transmit the data and a separate antenna 214-2 may be connected to the same transceiver 212-1 for receiving data.

Figure 3:
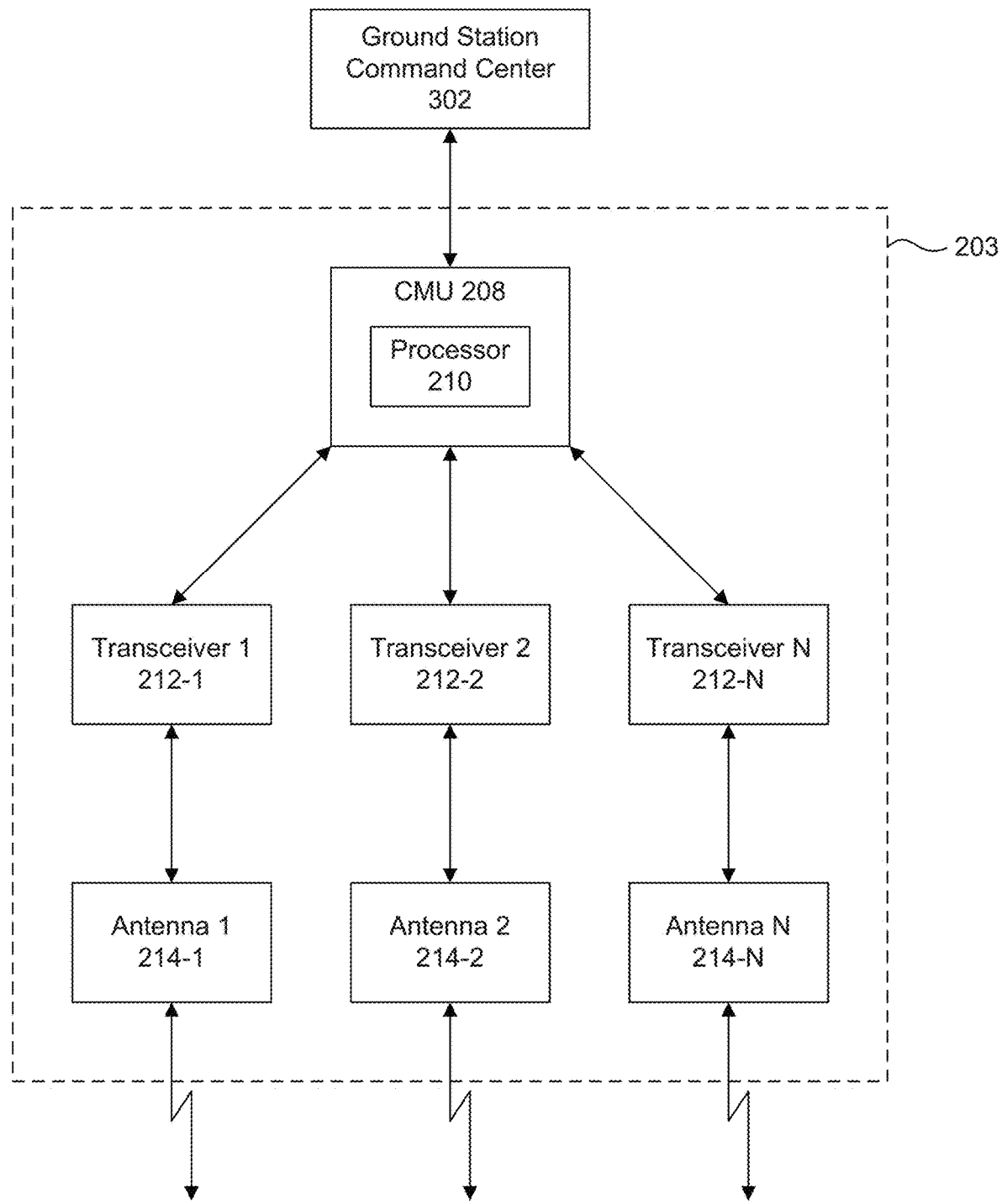
FIG. 3 is a block diagram of a performance-based link management system that includes multiple transceivers and a Ground Station Command Center, according to an example embodiment.

FIG. 3 illustrates an embodiment of the performance-based link management system 108. FIG. 3 is similar to FIG. 2, but shows a Ground Station Command Center 302 instead of the remote avionics application 201. The Ground Station Command Center 302 creates the application data to transmit. The application data may include instructions to ping the aircraft to ensure a healthy ACARS communication link, voice and text messages to the aircraft pilots, according to embodiments.

Figure 4:
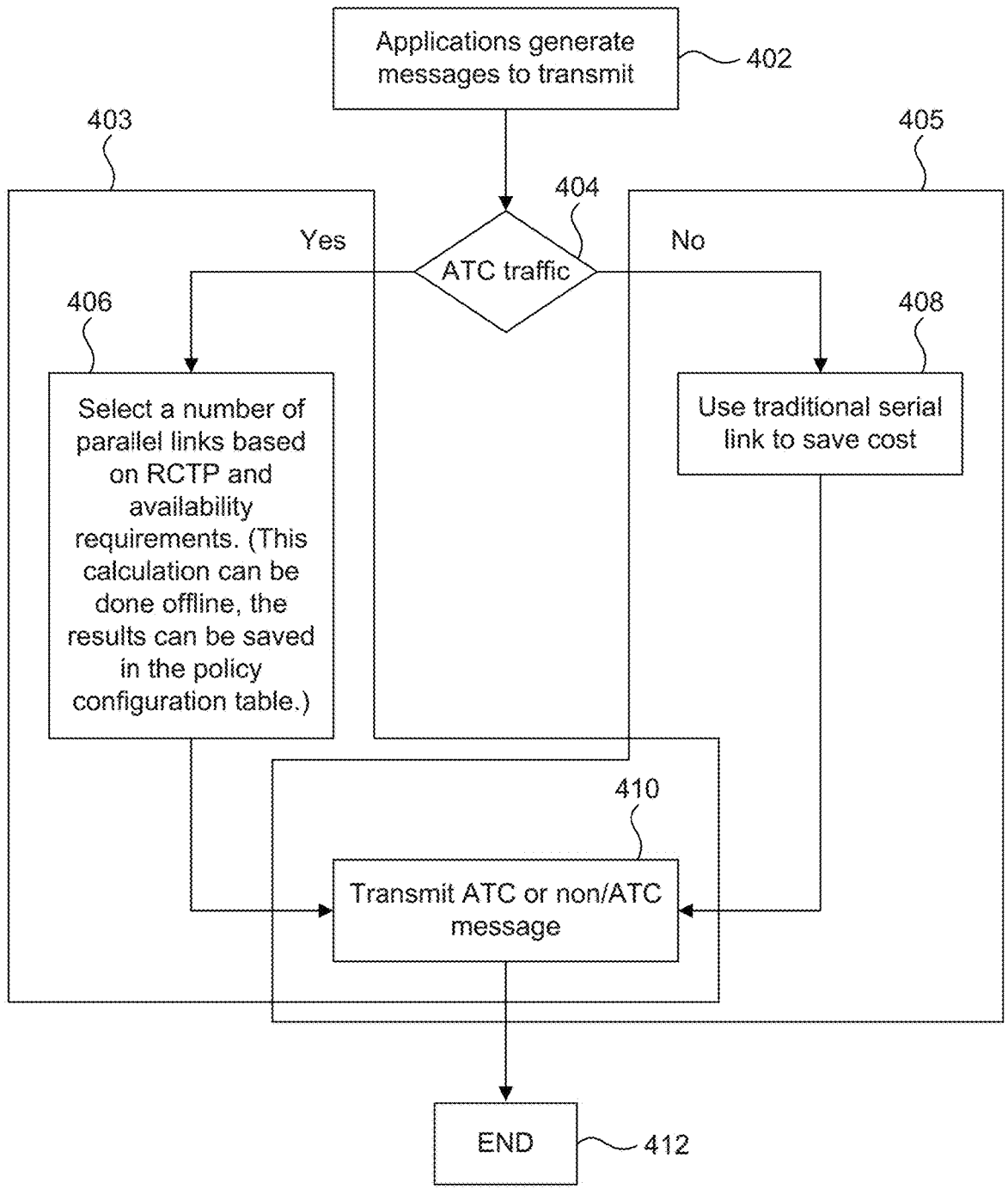
FIG. 4 is a flowchart illustrating a process for transmitting ATC and non-ATC messages from the performance-based link management system, according to an example embodiment.

FIG. 4 illustrates a method 400 for transmitting an ATC message or a non-ATC message in the performance-based link management system 200/300, according to an example embodiment. Method 400 may be performed with multiple embodiments of the performance-based link management system 200/300, including within air traffic control communication system 100. Process 400 may be performed by processing logic that may include hardware, software, or a combination thereof. In an embodiment, steps in FIG. 4 may not need to be performed in the order shown, as one skilled in the art would understand. In an embodiment, method 400 may be adjusted to transmit ATC and non-ATC messages in parallel if the applications generated the ATC and non-ATC message simultaneously.

In step 402, the remote avionic application 201 generates a message to transmit. In an embodiment, either the ACMS 202, the ATC 204, or the CMCS 206 may generate a message to transmit. The message may be created based on a specific need of the aircraft 102.

In step 404, the performance-based link management system 200/300 determines whether the generated message is an ATC message or a non-ATC message. In an embodiment, an Airline Operation Center (AOC) message is a type of non-ATC message. An AOC message may include information regarding fuel weight and balance information of the aircraft 102. An AOC message may also indicate whether the aircraft 102 is out of the gate, whether the aircraft is taking off from the ground, whether the aircraft is on the ground, or whether the aircraft is in the gate. Generally, these AOC messages do not need to meet the safety and performance requirements of ATC messages, and instead track the aircraft 102's status. Air traffic control communication utilizes ATC messages comprising required performance metrics. ATC messages are generally communicated between the aircraft 102 and the ground station 110, according to an embodiment.

If the message is an ATC message, step 406 is performed. In step 406, the CMU 208 may select a number of parallel links to transmit the ATC message. The selection of parallel links may be based on a number of factors, according to an embodiment. These factors may include airline requirements, the RCTP, the number of transceivers available, the availability requirement, etc. As an example of airline requirements, a given airline may designate particular links for ATC and non-ATC messages. As an example of transceivers being available, links may be selected if their corresponding transceivers are not in use. An example of an availability requirement and/or RCTP may be a requirement set by a government regulation. Calculation of the number of parallel links required to meet those factors may be performed in an offline process and will be explained in a further detail below.

If it is determined in step 404 the message is a non-ATC message, then step 408 is performed. In step 408, the CMU 208 may select a traditional serial link to save costs and bandwidth to transmit the non-ATC message. The reason to use the traditional serial link for a non-ATC message is that non-ATC messages are not as critical to aircraft 102 safety as ATC messages.

In step 410, the CMU 208 transmits the non-ATC message or the ATC message by the serial or the parallel links based on the decision made by step 404, according to an embodiment. The CMU 208 routes the message to transceivers 212, which transmits the message via antennas 214, according to an embodiment.

Figure 5:
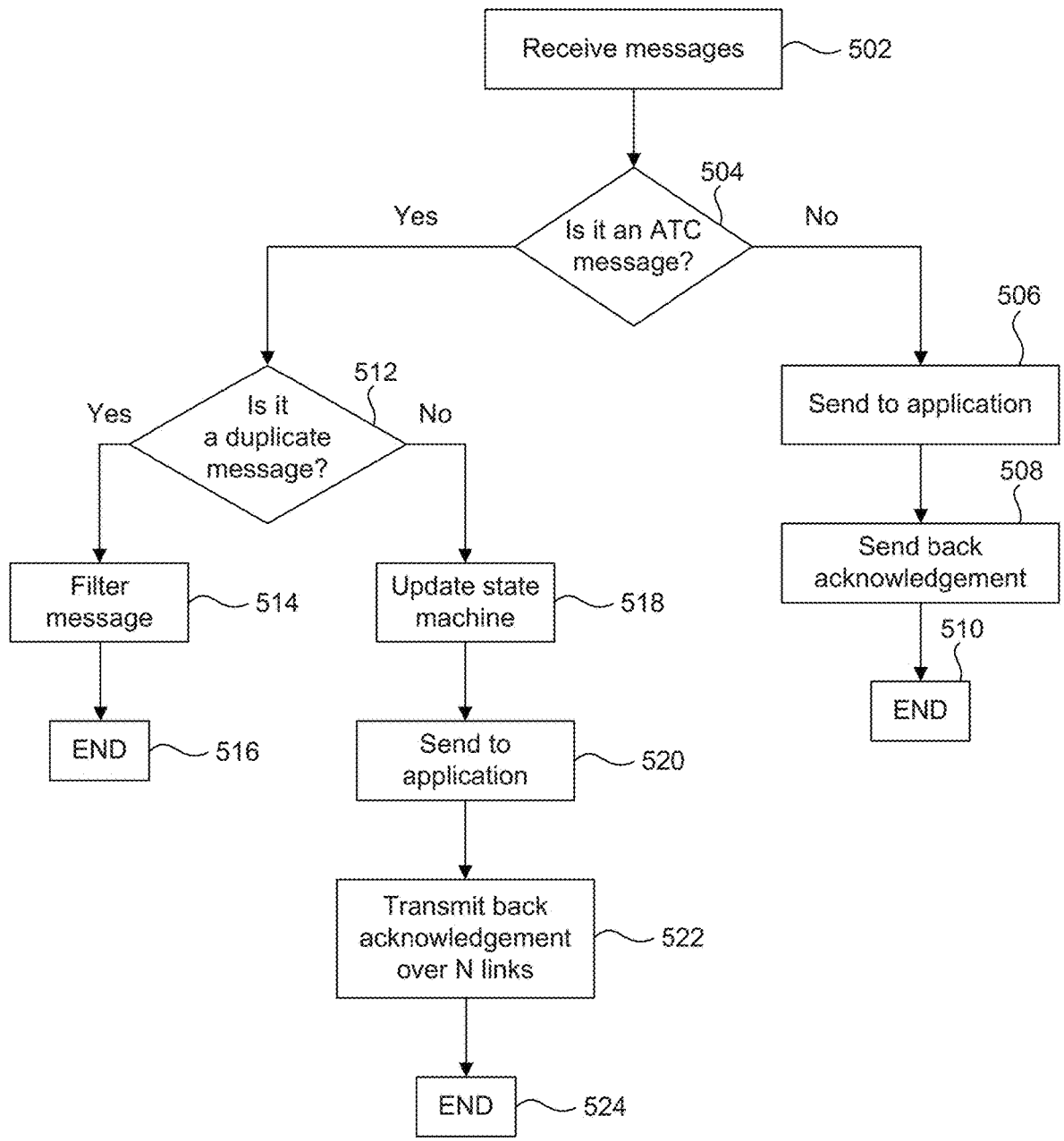
FIG. 5 is a flowchart illustrating a process for receiving ATC and non-ATC messages at the performance-based link management system, according to an example embodiment.

FIG. 5 illustrates a method 500 for receiving an ATC or a non-ATC message in the performance-based link management system 200/300, according to an example embodiment. Method 500 may be performed with multiple embodiments of the performance-based link management system 200/300, including within air traffic control communication system 100. Process 500 may be performed by processing logic that may include hardware, software, or a combination thereof. In an embodiment, steps in FIG. 5 may not need to be performed in the exact order shown, as one skilled in the art would understand. In an embodiment, method 500 may be adjusted to receive ATC and non-ATC messages in parallel if the ATC and non-ATC messages are transmitted simultaneously.

In step 502, the performance-based link management system 200/300 may receive data via antennas 214, according to an embodiment. In step 504, the CMU 208 determines if the data is an ATC or a non-ATC message.

Step 506 is performed if the data is not an ATC message. In step 506, the performance-based link management system 200/300 sends the non-ATC message to the Ground Station Command Center 302 by way of the CMU 208. Once the CMU 208 receives the message, the CMU 208 sends the message to ACMS 202, ATC 204, CMCS 206, or the Ground Station Command Center 302, where the received non-ATC message may be acted upon accordingly, according to an embodiment.

In step 508, the performance-based link management system 200/300 may send an acknowledgement across the selected links to increase the chance of receipt by the transmitting entity. Acknowledgements are the hand-shaking mechanism used to give the transmitting and receive sides knowledge that the message, either ATC or non-ATC, has been transmitted and received successfully.

If it is determined in step 504 that the data is an ATC message, then step 512 is performed. Step 512 verifies if the ATC message is a duplicate of a previously received ATC message. According to an embodiment, the ATC messages are prepended with a sequence number in-order to keep track of each ATC message transmitted at the transmission side. Prepending a sequence number gives security to transmissions of ATC messages. Also, it is possible from this sequence number to determine if a received ATC message is a duplicate of a previously received ATC message. This is further described below.

If the ATC message is a duplicate, then the message may be discarded and filtered in step 514 by CMU 208. This ensures the same ATC message is not processed multiple times by the performance-based link management system 200/300.

If the ATC message is not a duplicate, step 518 is performed. In step 518, the CMU 208 updates the states for each link. The CMU 208 keeps track of the states for each of the links on the received side of the performance-based link management system 200/300. The CMU 208 monitors each link by storing each received sequence number and comparing the current received sequence number to previously received sequence numbers. The CMU 208 discards any duplicate ATC message if the current received sequence number matches any of the previously received sequence numbers.

In step 520, the received ATC message may be sent to the remote avionic applications 201 or the Ground Station Command Center 302 by way of the CMU 208.

In step 522, the performance-based link management system 200/300 may send back an acknowledgement across the selected links, according to an embodiment. The acknowledgements may be sent back across all of the selected links so the transmitting side that transmitted the received ATC message may have a better chance of receiving the acknowledgment, instead of transmitting the acknowledgement over one link.

Figure 6:
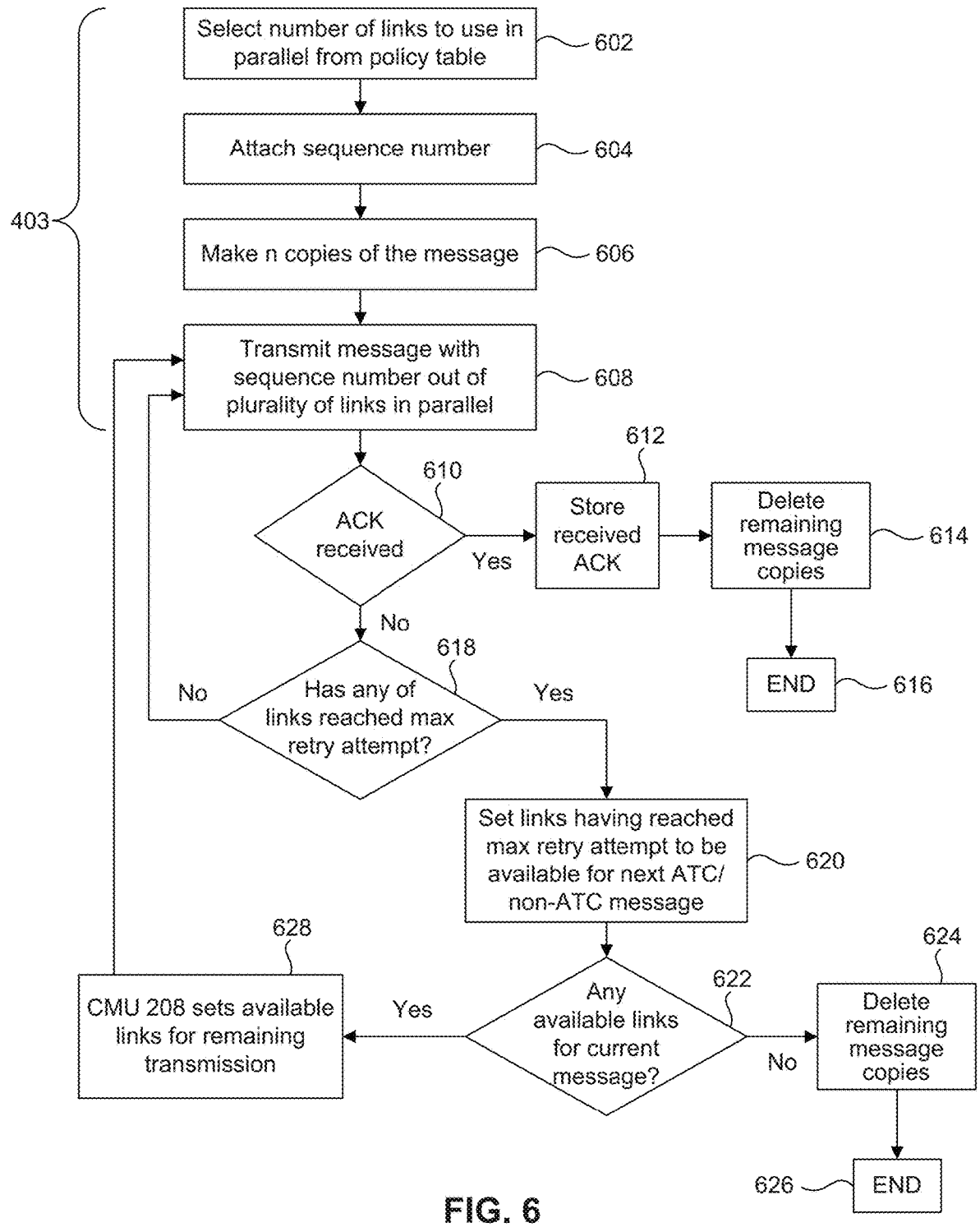
FIG. 6 is a flowchart illustrating a process for transmitting ATC messages and receiving acknowledgements at the performance-based link management system, according to an example embodiment.

FIG. 6 illustrates a more detailed method of method 400 for transmitting an ATC message in the performance-based link management system 200/300, according to an example embodiment. Specifically, FIG. 6 illustrates step 403 of FIG. 4 in greater detail. The method of FIG. 6 may be performed with multiple embodiments of the performance-based link management system 200/300, including within air traffic control communication system 100 and method 400. The method of FIG. 6 may be performed by processing logic that may include hardware, software, or a combination thereof. In an embodiment, steps in FIG. 6 may not need to be performed in the exact order shown, as one skilled in the art would understand.

In step 602, the CMU 208 may select a number of parallel links to use to transmit the ATC message. The selection of parallel links may be based on a number of factors, according to an embodiment. These factors may include but are not limited to airline requirements, the RCTP, the number of transceivers available and the availability requirement. Calculation of the number of parallel links required to meet these factors may be done in an offline step and will be explained further below.

In step 604 the CMU 208 may prepend a sequence number to the ATC message being transmitted. A sequence number may be prepended to each ATC message in order to reliably keep track of each ATC message transmitted. When a new message is generated, the sequence number may be incremented by one.

In step 606, the CMU 208 may create n copies of the ATC message. The CMU 208 may queue the n copied ATC messages for transmission.

In step 608, the CMU 208 routes the n copied ATC messages to the plurality of n parallel links chosen by step 602. More specifically, at step 608, the CMU 208 may route each of the n messages to the transceiver 212, according to an embodiment. The transceiver 212 may modulate, convert to RF, and send the up-converted ATC message to each of the n antennas 214.

In step 610, the performance-based link management system 200/300 waits a predetermined amount of time for an acknowledgement. This predetermined amount of time may be set based on the airline requirements, the availability requirements, the sub-network latency delay requirement, or any combination thereof. If an acknowledgment is received within the predetermined time limit, step 612 is performed.

In step 612, the CMU 208 stores the acknowledgements for the associated ATC message so that the ATC message is not retransmitted.

In step 614, any remaining, not yet transmitted queued copies of the message (from step 606) are deleted. It may be the case, however, that one or more copies of the message may be in the process of being transmitted. These duplicate message transmissions are handled by the receiver system in steps 512 and 514, as discussed above.

If an acknowledgement was not received in the predetermined time in step 610, the CMU 208 may check the status of all n links in the parallel link system in step 618. In an embodiment, the CMU 208 will check to see if any link has reached the link's max retry attempt. In an embodiment, the max retry attempt corresponds to the number of times a link will try to transmit the same message. In an embodiment, the max retry attempt number may be policy configurable and may be set based on airplane requirements and the type of message being transmitted. If none of the links have met their max retry attempt, control returns to step 608. Otherwise, step 620 is performed.

In step 620, any selected links at their max retry attempt may be made available for the transmission of other ATC or non-ATC messages.

In step 622, the CMU 208 determines if all the selected links are at their max retry attempt. If they are all at their max retry attempt, then no links are available for the current ATC message. Thus, in step 624, the CMU 208 deletes any remaining queued copies of messages from step 606. Further, the CMU 208 releases the selected links for subsequent transmission of other ATC or non-ATC messages.

Otherwise, the CMU 208 may use the remaining available links to re-transmit the ATC message. Thus, in step 628, the CMU 208 selects the remaining links available for re-transmission. The CMU 208 updates its system's link states reflecting the parallel links that are now available for other non-ATC/ATC messages and the remaining links that may be used to re-transmit the ATC message.

Figure 7:
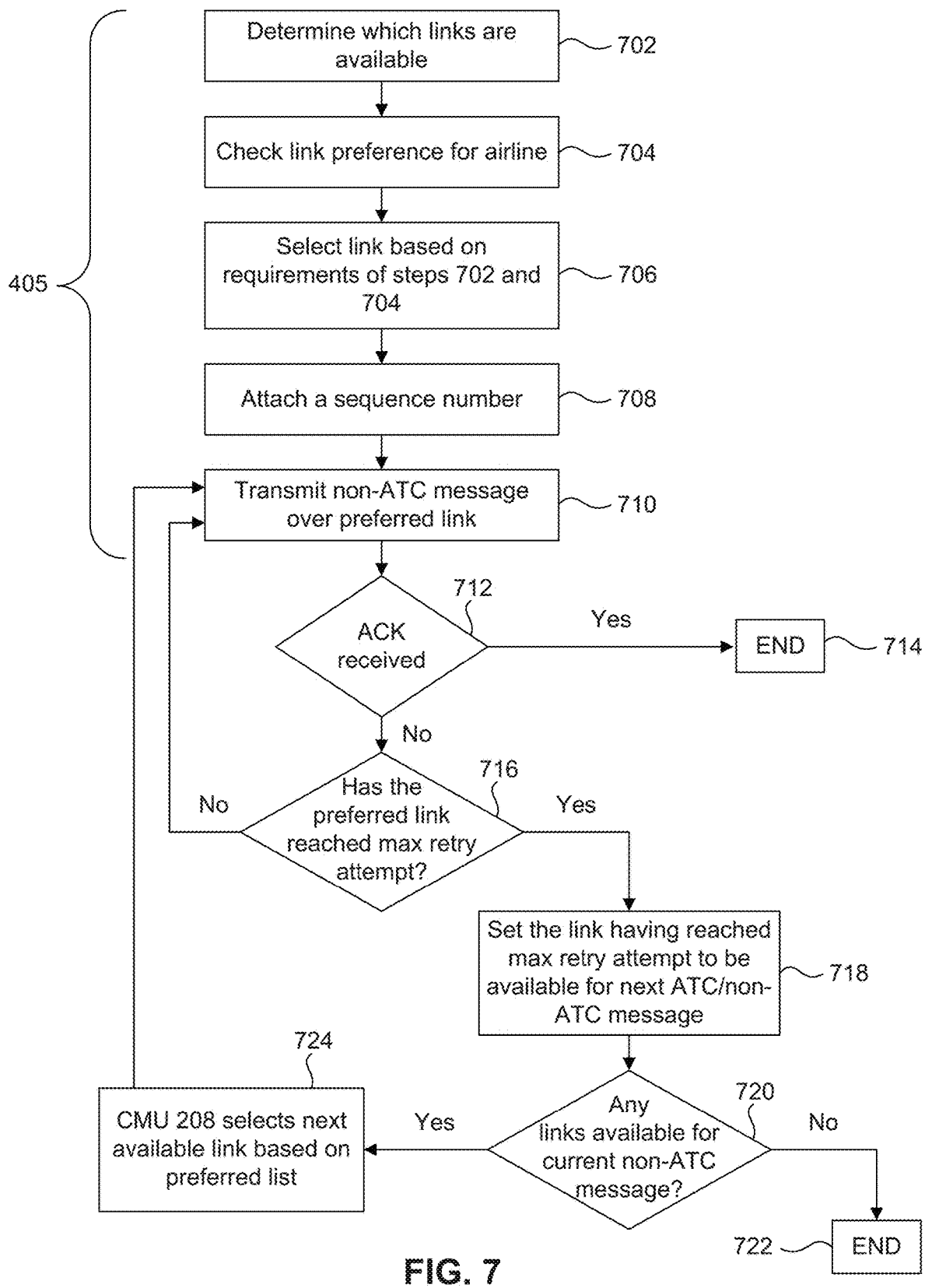
FIG. 7 is a flowchart illustrating a process for transmitting non-ATC messages and receiving acknowledgements at the performance-based link management system, according to an example embodiment.

FIG. 7 illustrates a more detailed method of method 400 for transmitting a non-ATC message, according to an example embodiment. Specifically, FIG. 7 illustrates step 405 of FIG. 4 in greater detail. The method of FIG. 7 may be performed with multiple embodiments of the performance-based link management system 200/300, including within air traffic control communication system 100 and method 400. The method of FIG. 7 may be performed by processing logic that may include hardware, software, or a combination thereof. In an embodiment, steps in FIG. 7 may not need to be performed in the exact order shown, as one skilled in the art would understand.

In step 702, the CMU 208 may check to see what links are available to transmit. This determination may be based on whether the transceiver 212 and antenna 214 are already transmitting or in the process of receiving data.

In step 704, the CMU 208 checks what the link preference may be for transmitting a non-ATC message. In an embodiment, a link preference for transmitting a non-ATC message may be VHF, HF, and SATCOM or any combination thereof. In an embodiment, the link preference for transmitting a non-ATC message may be at the discretion of the airline.

In step 706, the CMU 208 selects the link to transmit the non-ATC message based on the link preference from step 704 and what links are available in step 702.

In step 708, the CMU 208 may prepend a sequence number to the non-ATC message being transmitted. A sequence number may be prepended to each non-ATC message in-order to reliably keep track of each non-ATC message transmitted. When a new message is generated, the sequence number may be incremented by one.

In step 710, the CMU 208 routes the non-ATC message with the prepended sequence number to the preferred available link chosen by step 706. More specifically, the CMU 208 routes the non-ATC message to the transceiver 212 for transmission.

In step 712, the performance-based link management system 200/300 waits a predetermined amount of time for an acknowledgement. This predetermined amount of time may be set based on the airline requirements, the availability requirements, the sub-network latency delay requirement, or any combination thereof. If the CMU processor 210 receives the acknowledgment received within the predetermined time limit, the process ends.

If an acknowledgement was not received in the predetermined time in step 712, the CMU 208 may check the status of the preferred link in step 716. In an embodiment, the CMU 208 will check to see if the preferred link has reached the link's max retry attempt. The same requirements for the max retry attempt may apply in step 716 as described previously in step 618. If the preferred link has not yet met the link's max retry attempt, control returns to step 710. Otherwise, step 718 is performed.

In step 718, the CMU 208 makes the preferred link available for the transmission of other ATC or non-ATC messages.

In step 720, the CMU 208 determines if all the preferred links for the airline are being used for other ATC or non-ATC messages. If all the links are being used for other messages, then no links are available for the current non-ATC message and in step 722, the process ends.

Otherwise, the CMU 208 may select the next preferred link that is available to re-transmit the non-ATC message in step 724. The CMU 208 updates its system reflecting the links that are now available for other non-ATC/ATC messages and the remaining links that may be used to re-transmit the non-ATC message.

Figure 8:
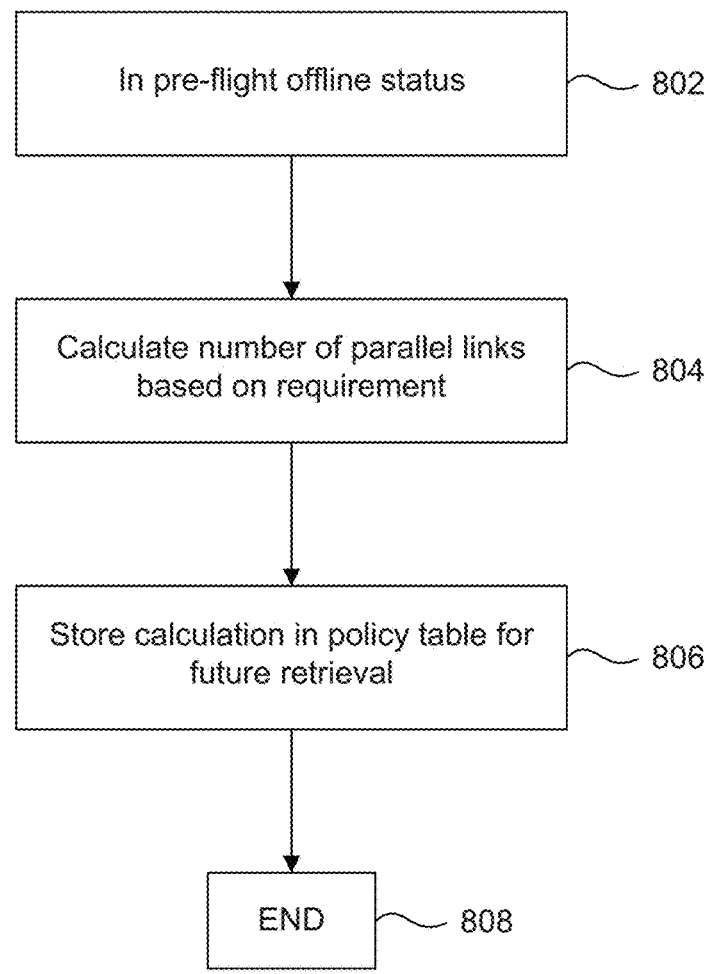
FIG. 8 is a flowchart illustrating an offline process for calculating the number of parallel links and storing in a policy table at the performance-based link management system, according to an example embodiment.

FIG. 8 illustrates a method 800 for calculating the number of parallel links based on, for example, airline requirements, the RCTP, the number of transceivers available, or any combination thereof, according to an example embodiment. Method 800 may be performed with multiple embodiments of the performance-based link management system 200/300, including within air traffic control communication system 100. Process 800 may be performed by processing logic that may include hardware, software, or a combination thereof. In an embodiment, steps in FIG. 8 may not need to be performed in the exact order shown, as one skilled in the art would understand.

An advantage for using parallel links for transmission in the performance-based link management system 200/300 is to reduce sub-network latency. To understand how parallel links reduce sub-network latency, assume the latencies of the n parallel links are denoted by $x_1, x_2, \ldots x_n$. The latency y of n simultaneous parallel links may be the minimum latency of the aggregation of the n simultaneous parallel links. An equation to determine the minimum link latency may be shown as follows.

$$y = \min(x_1, x_2, \ldots, x_n) \quad (2)$$

Assume the latencies of the n parallel links, i.e., $x_1, x_2, \ldots, x_n$, are independent random variables. The Cumulative Distribution Function (CDF) of the n parallel links are denoted by $F_{X1}(t), F_{X2}(t), \ldots F_{Xn}(t)$, wherein the CDF $F_Y(t)$ of n simultaneous parallel links can be calculated using an equation as follows:

$$F_Y(t) = 1 - \prod_{i=1}^{n}[1 - F_{Xi}(t)] \quad (3)$$

Using the CDF F(t), the (100×p)-th percentile $t_p$, can be calculated as follows:

$$t_p = F^{-1}(p) \quad (4)$$

In an embodiment, assuming each single link has the same latency distribution, Equations 3 and 4 indicate that the $99.9^{th}$ percentile of latency for a single link is about 95 seconds, whereas the $99.9^{th}$ percentile of latency for two parallel links is about 15 seconds. This 6 fold latency reduction from one link to two parallel links greatly reduces the sub-network latency delay. From two parallel links to three parallel links, Equations 3 and 4 indicate the $99.9^{th}$ percentile of latency for three parallel links is about 7 seconds, an even greater improvement from the single link. In an embodiment, the probability density function could be used as well to calculate the latency for a particular link, which would further show that parallel links can effectively shorten the network latency for ATC communications.

In an embodiment, step 802 may be an offline processing step performed by the CMU 208. The offline processing step may have requirements to meet in terms of the availability A and the RCTP of the corresponding ATC service. In step 804, the number of parallel links required are calculated based on the availability A and latency CDF $F_Y(t)$ of the selected available parallel links. In an embodiment, the two equations used to calculate the availability are Equation 1 and Equation 3 (above). In an embodiment, once the results are calculated, in order to select the required number of available links, there are three requirements that should be met:

$$A > A_{Req} \quad (5)$$

$$t_{0.95} = F_Y^{-1}(0.95) < T_{0.95} \quad (6)$$

$$t_{0.999} = F_Y^{-1}(0.999) < T_{0.999} \quad (7)$$

Equations 5, 6 and 7 represent the requirements needed for calculating the parallel links. In Equation 5, A corresponds to the calculated availability from Equation 1. $A_{Req}$ corresponds to the required availability set forth by the S1 DCP. In Equation 6, the $T_{0.95}$ may be the required $95^{th}$ percentile latency. Also in Equation 5, $t_{0.95}$ may be (100×p)-th percentile for a latency CDF distribution. In Equation 7, the $T_{0.999}$ may be the required $99.9^{th}$ percentile latency. Also in Equation 7, $t_{0.999}$ may be the (100×p)-th percentile for a latency CDF distribution. In the above, p may be the percentage of the link's distribution.

In step 806, the number of parallel links calculated in step 804 are stored in a policy table. The policy table may be stored in memory in the CMU 208. During transmission of an ATC message as described above, the number of parallel links may be retrieved from the policy table in the database.

Figure 9:
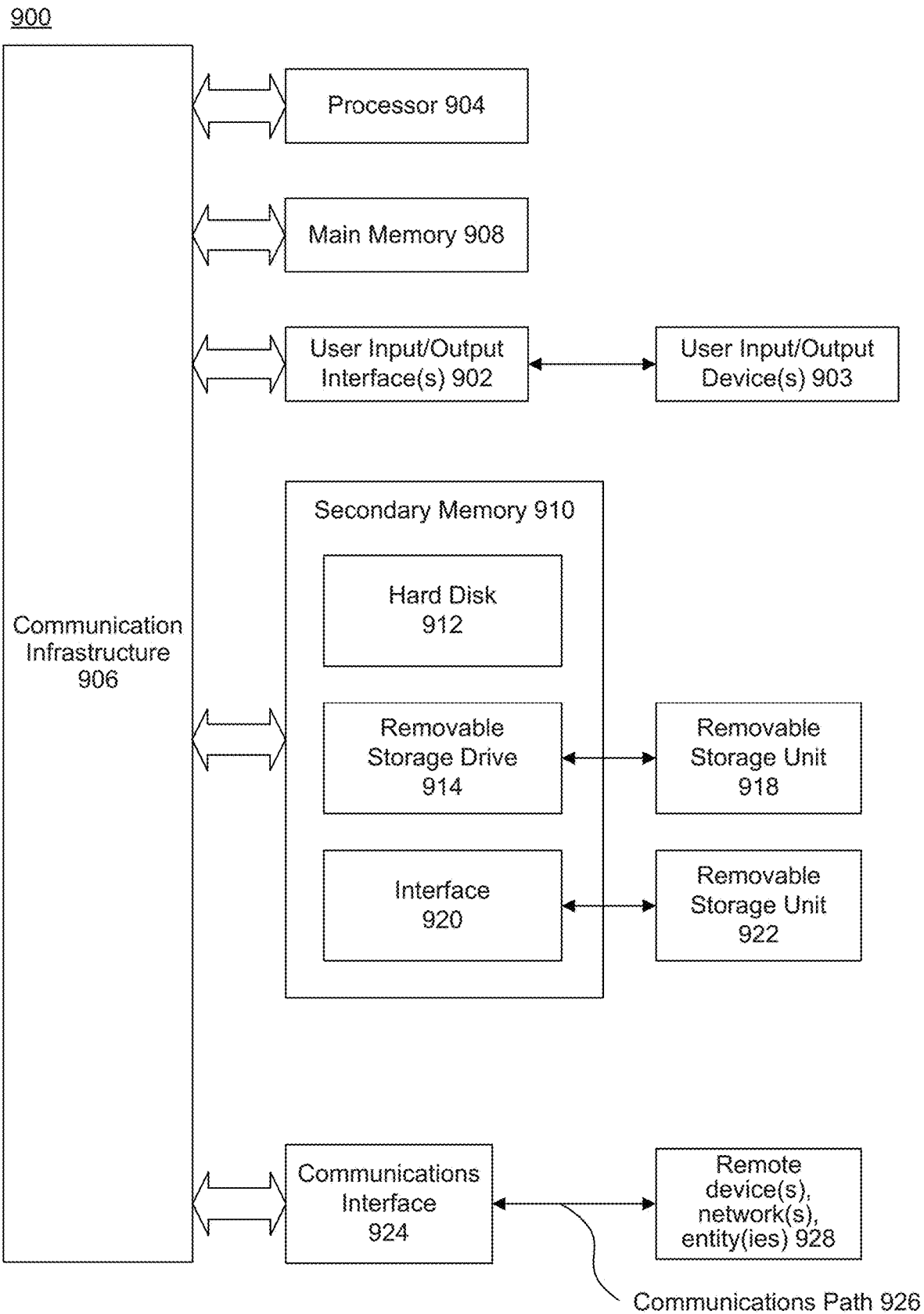
FIG. 9 is an example computer system useful for implementing various embodiments.

FIG. 9 is an example computer system to that may be used to implement aspects of the systems illustrated in FIGS. 1-3, or which may be specially programmed to implement aspects of the methods illustrated in FIGS. 4-8.

Various embodiments can be implemented, for example, using one or more well-known computer systems, such as computer system 900 shown in FIG. 9. Computer system 900 can be any well-known computer capable of performing the functions described herein.

Computer system 900 includes one or more processors (also called central processing units, or CPUs), such as a processor 904. Processor 904 is connected to a communication infrastructure or bus 906.

Computer system 900 also includes user input/output device(s) 903, such as monitors, keyboards, pointing devices, etc., which communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system xx00 to communicate and interact with any combination of remote devices, remote networks, remote entities, etc. (individually and collectively referenced by reference number xx28). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

In an embodiment, a tangible apparatus or article of manufacture comprising a tangible computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 9. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A performance-based link management system configured to manage communications of a vehicle, the performance-based link management system comprising:
   a remote management component comprising:
   a monitor system module configured to monitor status of an onboard system of the vehicle; and
   a central maintenance system configured to collect maintenance information associated with the vehicle; and
   a communications system in communication with the remote management component, the communications system comprising:
   a communications management unit configured to generate a number of parallel messages from a message received from the remote management component, wherein each parallel message of the number of parallel messages is a copy of the message received from the remote management component, wherein the number of parallel messages matches a number of transceivers of a plurality of transceivers;

the plurality of transceivers, wherein each transceiver in the plurality of transceivers is configured to receive, from the communications management unit, a parallel message of the number of parallel messages; and
a plurality of antennae in communication with the plurality of transceivers, wherein each antenna of the plurality of antennae is configured to transmit the parallel message.

2. The performance-based link management system of claim 1, wherein the vehicle is a mobile vehicle.

3. The performance-based link management system of claim 1, wherein the vehicle is an aircraft.

4. The performance-based link management system of claim 1 performance-based link management system of wherein the message received from the remote management component is transmitted from one of the monitor system module or the central maintenance system.

5. The performance-based link management system of claim 1, wherein the remote management component further comprises an air traffic control module configured to:
receive air traffic control information; and
transmit an air traffic control message to the communications system.

6. The performance-based link management system of claim 5, wherein the communications management unit is further configured to:
calculate a number of transceivers from the plurality of transceivers for transmitting the number of parallel messages, wherein to calculate the number of transceivers, the communications management unit is further configured to:
determine an overall availability of the number of transceivers, wherein the number of transceivers is calculated based on the overall availability being greater than an availability requirement for transmitting the air traffic control message;
select the number of transceivers;
copy the air traffic control message to produce the number of parallel messages; and
transmit, via a corresponding number of antennae from the plurality of antennae, the number of parallel messages using the selected number of transceivers.

7. The performance-based link management system of claim 6, wherein selecting the number of transceivers comprises selecting at least transceiver based on one or more of airline requirements, required communication technical performance and the availability requirement.

8. The performance-based link management system of claim 1, wherein the remote management component is a remote avionics application.

9. The performance-based link management system of claim 1, wherein a first transceiver of the plurality of transceivers utilizes a satellite communications link, a second transceiver of the plurality of transceivers utilizes a plain old aircraft communications addressing and reporting system (POA) link, and a third transceiver of the plurality of transceivers utilizes a very high frequency data link-mode (VDL) link.

10. The performance-based link management system of claim 9, wherein the first transceiver is configured to receive a first parallel message of the number of parallel messages from the communications management unit, the second transceiver is configured to receive a second parallel message of the number of parallel messages from the communications management unit, and the third transceiver is configured to receive a third parallel message of the number of parallel messages from the communications management unit.

11. The performance-based link management system of claim 1, wherein the message received from the remote management component comprises at least one of the status of the onboard system of the vehicle and the maintenance information associated with the vehicle.

12. A method by a performance-based link management system configured to manage communications of a vehicle, comprising:
monitoring, by a remote management component of the performance-based link management system, a status of an onboard system of the vehicle;
collecting, by the remote management component, maintenance information associated with the vehicle;
generating, by a communications management unit of the performance-based link management system, a number of parallel messages from a message received from the remote management component, wherein each parallel message of the number of parallel messages is a copy of the message received from the remote management component, wherein the number of parallel messages matches a number of transceivers of a plurality of transceivers;
providing the number of parallel messages to the plurality of transceivers, wherein each transceiver in the plurality of transceivers is configured to receive, from the communications management unit, a parallel message of the number of parallel messages; and
transmitting, by a plurality of antennae in communication with the plurality of transceivers, the number of parallel messages, wherein each antenna of the plurality of antennae is configured to transmit the parallel message.

13. The method of claim 12, wherein the vehicle is a mobile vehicle.

14. The method of claim 12, wherein the vehicle is an aircraft.

15. The method of claim 12, wherein the message received from the remote management component is transmitted from one of a monitor system module or a central maintenance system.

16. The method of claim 12, wherein the remote management component further comprises an air traffic control module, and the method further comprising:
receiving, by the air traffic control module, air traffic control information; and
transmitting, by the air traffic control module, an air traffic control message to the communications management unit.

17. The method of claim 12, wherein a first transceiver of the plurality of transceivers utilizes a satellite communications link, a second transceiver of the plurality of transceivers utilizes a plain old aircraft communications addressing and reporting system (POA) link, and a third transceiver of the plurality of transceivers utilizes a very high frequency data link-mode (VDL) link.

18. A non-transitory tangible computer-readable device having instructions stored thereon that, when executed by at least one computing device, cause the at least one computing device to perform operations comprising:
monitoring, by a remote management component of a performance-based link management system, a status of an onboard system of a vehicle;
collecting, by the remote management component, maintenance information associated with the vehicle;

generating, by a communications management unit of the performance-based link management system, a number of parallel messages from a message received from the remote management component, wherein each parallel message of the number of parallel messages is a copy of the message received from the remote management component, wherein the number of parallel messages matches a number of transceivers of a plurality of transceivers;

providing the number of parallel messages to the plurality of transceivers, wherein each transceiver in the plurality of transceivers is configured to receive, from the communications management unit, a parallel message of the number of parallel messages; and transmitting, by a plurality of antennae in communication with the plurality of transceivers, the number of parallel messages, wherein each antenna of the plurality of antennae is configured to transmit the parallel message.

19. The non-transitory tangible computer-readable device of claim 18, wherein the vehicle is a mobile vehicle.

20. The non-transitory tangible computer-readable device of claim 18, wherein the vehicle is an aircraft.

* * * * *